Patented May 5, 1953

2,637,704

UNITED STATES PATENT OFFICE 2,637,704

CONDENSATION PRODUCT OF POLYMERIC PHOSPHONITRILIC CHLORIDE, CHLORO-ANILINE, AND A POLYAMINO COMPOUND

Forrest R. Hurley, Dayton, Ohio, assignor to Monsanto Chemical Company, St. Louis, Mo., a corporation of Delaware No Drawing. Application July 29, 1949,
Serial No. 107,627

8 Claims. (Cl. 260—9)

The present invention relates to a new condensation product derived from phosphonitrilic chloride, a chloroaniline and an ammonocarbonic acid and to flame proofed and glow proofed products produced therewith.

An object of the present invention is the provision of a new condensation product containing phosphorus, nitrogen, carbon and non-hydrolyzable chlorine which product is insoluble in cold water and in aromatic hydrocarbons. A further object is the provision of a method for producing such condensation products. A still further object is the provision of flameproofing compositions and methods utilizing the aforesaid condensation products.

I have found that a mixture consisting of polymeric phosphonitrilic chloride, a chloroaniline and an ammonocarbonic acid or an ammonolysis product of an aquocarbonic acid such as urea, guanidine, guanidine carbonate, aminoguanidine bicarbonate, and guanylurea may be reacted together by the application of heat thereto and a condensation product obtained which is substantially insoluble in cold water and in aromatic hydrocarbons and which furthermore has pronounced flameproofing properties when applied to combustible materials such as cellulose or products derived therefrom.

According to British Patent No. 568,594 a reaction between phosphonitrilic chloride and a secondary or tertiary aromatic amine derivative such as the anilides of carboxylic acids, namely, acetanilide, phenylurea, diphenyl guanidine, phenylurethane, etc. has been disclosed. This reaction is believed to result in the formation of anhydro-phosphimic acid anils or compounds related thereto, together with carboxylic acid chlorides.

According to the present invention solid resinous condensation products are prepared by causing a reaction to take place between phosphonitrilic chloride polymers $(PNCl_2)_n$, chloroaniline and an ammonocarbonic acid. The degree of molecular aggregation of the phosphonitrilic chloride is indicated by the letter $n$, which may have a numerical value anywhere from 3 to 12 or even higher. By the present reaction phosphimic amides are formed in which on the average one out of 3 phosphorus atoms of the phosphonitrilic chloride polymer, originally bound to 2 chloride atoms becomes attached to one nitrogen atom carrying a chloro-phenyl group. The remaining chlorine atoms in the molecule become combined with the residues of the ammonocarbonic acid with liberation of HCl. The ultimate condensation product is substantially free of hydrolyzable chlorine and for this reason is practically free of acidic groups. The product so produced contains a desirably low ratio of carbon to phosphorus in the molecule and accordingly may be employed for the production of flame and glow proofing effects on combustible materials.

The chloroanilines employed may contain up to as many as 5 chlorine atoms per molecule, although for most purposes the mono or dichloro derivatives will be found to be satisfactory. Of the mono chloro derivatives I may use the parachloroaniline and of the dichloro derivatives the 2,5 or the 2,4 derivatives.

The ammonocarbonic acids (or ammonolyzed carbonic acids or carbonic acid salts) employed may be urea, guanidine, guanidine carbonate, amino guanidine bicarbonate, or guanylurea. Generally only one of the amino groups is reacted with the chlorine contained in the phosphonitrilic chloride molecule so that it will be desirable to employ at least 5 mols of the ammonocarbonic acid or carbonic acid salt with each 3 mols of $PNCl_2$. If however an excess is used the unreacted portion is generally water soluble and may be subsequently removed from the reaction product if desired by leaching with water.

The present reaction is induced merely by heating a mixture of the phosphonitrilic chloride, the chloroaniline and ammonocarbonic acid compound. The reaction is initiated by heating the mixture to at least 120° C. at which point an exothermic reaction occurs which may carry the temperature of the reacting mass up to as high as 250° C.–300° C. If desired the reaction may be carried out in an inert solvent of suitable boiling point in which case the exothermic heat will cause some of the solvent to vaporize without excessively raising the temperature of the reaction mixture. Suitable solvents for this purpose are nitrobenzene, dichlorobenzene, trichlorobenzene, decahydronaphthalene, tetrachloroethane, pentachloroethane, etc. Upon completion of the reaction the solvent may be removed by distillation or filtration and the essentially insoluble condensation product thus recovered.

The following examples will serve to further illustrate this invention:

Example 1

43.0 grams of 2,5 dichloroaniline, 140.0 grams of urea and 139.6 grams of polyphosphonitrilic chloride were mixed together and heated to the melting point. The mixture melted at about 120° C. Heating was continued until a temperature of about 140° C. was reached at which point a rather violent exothermic reaction started accompanied by evolution of HCl, the temperature rising to approximately 265° C. Upon cooling to room temperature the product which weighed 259.0 grams consisted of a grayish white solid and was ground to a fine powder. This material was insoluble in benzene and in cold water. In hot water it was somewhat soluble.

*Example 2*

35.0 grams of polyphosphonitrilic chloride containing on the average 11 $(PNCl_2)$ units per molecule, 40.0 grams of urea and 12.0 grams of 2,5 dichloroaniline were heated to about 140° C. at which temperature the exothermic reaction started. The temperature was then held at 215° C. for 8 hours. 33.0 grams of product were recovered. The material was a grayish white solid which was ground to a fine powder.

*Example 3*

3.5 grams of polymeric phosphonitrilic chloride containing a mixture of the trimer and the tetramer, (the mixture contained 75 percent by weight of the trimer), 3.6 grams of guanidine carbonate and 1.3 grams of p-chloroaniline were heated to the reaction temperature of approximately 120° C. After subsidence of the reaction and upon cooling to room temperature a white solid product was obtained which was substantially insoluble in aromatic solvents.

*Example 4*

80.0 grams of $(PNCl_2)_5$, 12.2 grams of p-chloroaniline and 29.0 grams of guanidine carbonate were fused and reacted. The product a white solid was substantially insoluble in benzene and in cold water.

*Example 5*

A cotton textile fabric known as "Indian Head" was treated with a water slurry of the condensation product produced in Example 1 above. The quantity of condensation product added was approximately 40 percent by weight of the untreated fabric. On drying the treated fabric and subjecting the material to a flame it was found to be substantially incombustible.

The present condensation products are of particular utility in combination with other flameproofing products and processes and in particular with those flameproofing compositions employing antimony oxide. When employed in flameproofing compositions containing antimony oxide the present condensation products materially reduce the afterglow imparted by the antimony oxide. When so employed the present condensation product should be utilized in amounts varying from 10 percent to 100 percent of the antimony oxide in the flameproofing formulation. The following example illustrates the use of the present product as a glow proofer.

*Example 6*

A condensation product of phosphonitrilic chloride, urea and dichloroaniline such as is produced in Example 2 above was employed in the formula given in the book, Flameproofing Textile Fabrics by R. W. Little (1947) A. C. S. Monograph, page 264. The formula as modified consisted of the following ingredients:

| | Parts |
|---|---|
| Copolymer of vinyl chloride-vinyl acetate | 8.8 |
| $Sb_2O_3$ | 8.8 |
| Triphenyl phosphate | 8.8 |
| Product of Example 2 | 2.9 |
| Methyl ethyl ketone | 70.7 |

This formulation in the form of a suspension was applied to the cotton cloth by immersion followed by air drying. The increased weight of the treated cloth indicated an add-on of 50 percent. Not only was the sample flameproof and glowproof but it remained so after six washings in a conventional home washing machine.

What I claim is:

1. A condensation product of polymeric $(PNCl_2)_n$ where $n$ is an integer having a value of from 3 to 12, chloroaniline and a material selected from the class consisting of urea, guanylurea, guanidine, guanidine carbonate and aminoguanidine bicarbonate.

2. A condensation product of $(PNCl_2)_n$, where $n$ is an integer having a value of from 3 to 12 with chloroaniline and a material selected from the class consisting of urea, guanylurea, guanidine, guanidine carbonate and aminoguanidine bicarbonate.

3. A condensation product of $(PNCl_2)_n$, where $n$ is an integer having a value of from 3 to 12 with an unsubstituted dichloroaniline and urea.

4. A method for reducing the combustibility of normally combustible products which comprises applying to combustible material a condensation product of $(PNCl_2)_n$, where $n$ is an integer having a value of from 3 to 12, an unsubstituted dichloroaniline and urea.

5. Cellulosic textile products containing a condensation product of $(PNCl_2)_n$, where $n$ is an integer having a value of from 3 to 12, an unsubstituted dichloroaniline and urea in amount sufficient to decrease the combustibility thereof.

6. A process for producing a condensation product which comprises heating to a temperature of about 120° C. a mixture of $(PNCl_2)_n$, where $n$ is an integer having a value of from 3 to 12, an unsubstituted chloroaniline and a material selected from the class consisting of urea, guanylurea, guanidine, guanidine carbonate and aminoguanidine bicarbonate.

7. A process for producing a condensation product which comprises heating to a temperature of about 120° C. a mixture comprising $(PNCl_2)_n$, where $n$ is an integer having a value of from 3 to 12, an unsubstituted dichloroaniline and urea, and recovering a condensation product.

8. Cellulosic material containing a condensation product of $(PNCl_2)_n$, where $n$ is an integer having a value of from 3 to 12, an unsubstituted chloroaniline and a material selected from the group consisting of urea, guanylurea, guanidine, guanidine carbonate and aminoguanidine bicarbonate.

FORREST R. HURLEY.

References Cited in the file of this patent

UNITED STATES PATENTS

| Number | Name | Date |
|---|---|---|
| 2,374,646 | Brown | May 1, 1945 |